Sept. 13, 1927.
D. E. HENNESSY
1,642,546
IMPREGNATING AND VULCANIZING PROCESS
Filed Oct. 12, 1922
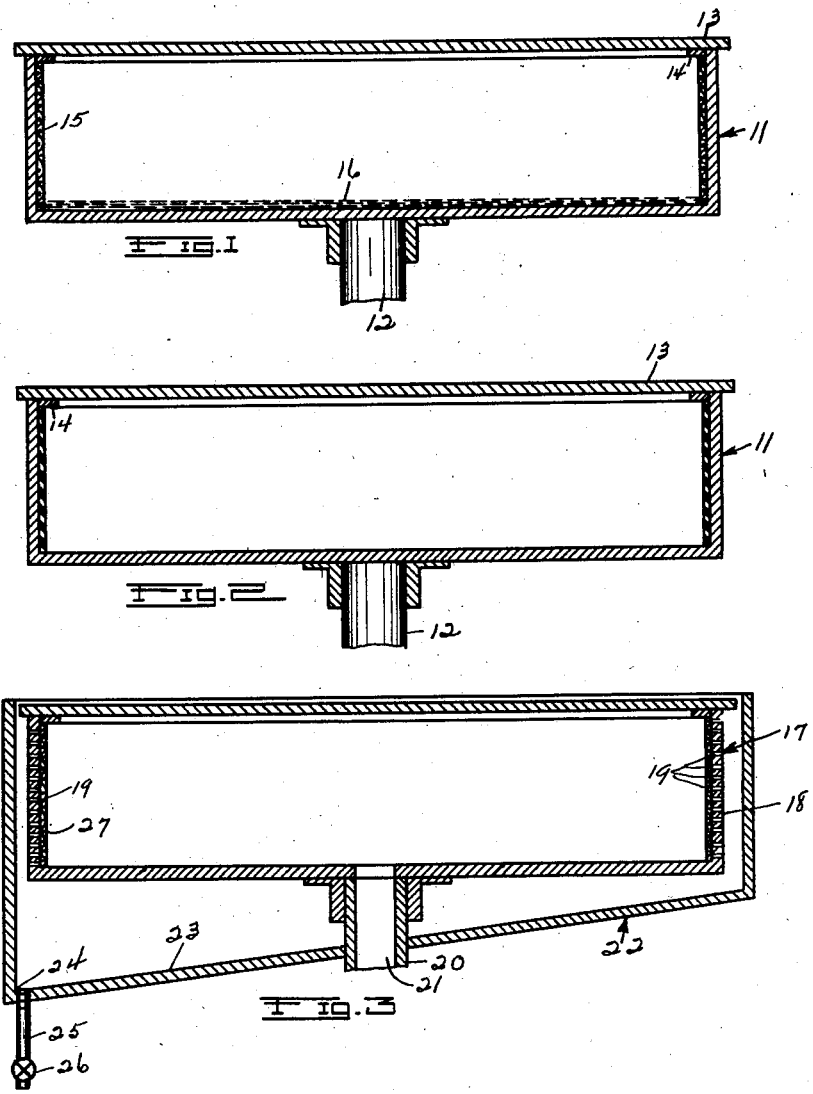
DANIEL E. HENNESSY
INVENTOR
BY
ATTORNEY Patented Sept. 13, 1927.

1,642,546

UNITED STATES PATENT OFFICE.

DANIEL E. HENNESSY, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

IMPREGNATING AND VULCANIZING PROCESS.

Application filed October 12, 1922. Serial No. 594,098.

Recently it has been proposed to vulcanize rubberized fabric by subjecting it alternately to the action of two agencies which will combine with each other to produce a vulcanizing agent and an inert substance. In particular it has been proposed to use hydrogen sulphide and sulphur chloride which would obviously combine to produce sulphur and hydrochloric acid. My invention provides an improved method for carrying out this process. In the drawings accompanying this specification and forming a part thereof I have shown, for purposes of illustration, two forms of apparatus which may be used to carry out my invention and illustrated three methods by which this apparatus may be used for that purpose. In these drawings:

Figures 1 and 2 represent one form of apparatus and illustrate one method, while Figure 3 represents a second form of apparatus and illustrates two further methods.

In Figures 1 and 2 I have shown a chamber 11 rotatably mounted upon an axis 12 and adapted to be closed by a cover 13 provided with a flange 14 adapted to seat within the side walls of the chamber 11 to prevent lateral displacement of the cover 13. In operation the fabric 15 to be vulcanized is placed within the chamber 11 and into this chamber is introduced the amount of rubber solution sufficient to impregnate the fabric 15 and the amount of hydrogen sulphide and sulphur chloride necessary to produce the quantity of sulphur required to vulcanize the rubber. These fluids are shown at 16 in Figure 1. Before the sulphur chloride and hydrogen sulphide have an opportunity to react to any appreciable extent the chamber 11 is rapidly rotated to throw the solutions into the fabric 15 by the action of so-called centrifugal force and the chamber 11 may be maintained in rotation until the sulphur chloride and hydrogen sulphide have had an opportunity to react to produce sulphur and this sulphur has reacted with the rubber to produce the desired vulcanization after which the chamber 11 is stopped and the vulcanized fabric is removed.

In Figure 3 I have shown a chamber 17 similar to the chamber 11 except that its side walls 18 are perforated at a plurality of points 19 and its axis 20 is apertured as shown at 21 to permit the introduction of material into the chamber 17 while it is rotating. This chamber 17 is surrounded by a receptacle 22 adapted to collect material thrown out through the apertures 19 and provided with a sloping bottom 23 to cause the material to concentrate at the low point 24 from which it may be drawn in any suitable manner as by means of a duct 25 controlled by a valve 26.

According to one method of operation the fabric 27 to be rubberized is placed within the chamber 17 and the chamber 17 rapidly rotated after which there is introduced into the chamber 17 a mixture of rubber solution and either sulphur chloride or hydrogen sulphide which mixture is immediately thrown against the fabric 27 by the so-called centrifugal force and partly retained by the fabric and partly thrown through the fabric and the apertures 19 to be collected into receptacle 22 and removed. Following this there is introduced into the chamber 17 a mixture of rubber solution and the second vulcanizing solution which is also thrown against the fabric 27 to be partially retained and partially thrown out into the receptacle 22 and removed through the duct 25. The portion of each of these fluids which passes through is returned to be re-used while the portion which remains in the fabric 27 reacts with the similarly remaining portion of the other mixture and produces a partial rubberization of the fabric and at least partial vulcanization of this rubber. The cycle is then repeated until the fabric is completely rubberized and the rubber properly vulcanized.

The apparatus in Figure 3 may also be used to carry out a further method in which the cycle consists in introducing the rubber solution first separate from either of the vulcanizing agents and then introducing first one vulcanizing agent and then the other.

In the above I have shown two particular forms of apparatus useful in carrying out three particular methods but this apparatus may be used for other purposes and these methods may be carried out by other apparatus. Further, I have specified two particular vulcanizing agents but I may, of course, use any other combination of agents suitable for the purpose and this combination may consist of any number of agents, including a single agent. In general, this disclosure is illustrative only and my invention is not limited thereto.

I claim:

1. The method of impregnating and vulcanizing fabric which comprises enclosing the fabric in the presence of a solution of rubber and a plurality of agents, co-acting to produce an agent adapted to vulcanize the rubber, and forcing the solution and agents into and through the fabric by centrifugal action to thereby simultaneously impregnate the fabric and vulcanize the rubber.

2. The method of impregnating and vulcanizing fabric which comprises simultaneously forcing a solution of rubber and a vulcanizing agent into the fabric whereby the fabric is impregnated as the rubber is vulcanized.

3. The method of impregnating and vulcanizing fabric which comprises simultaneously forcing a solution of rubber and a plurality of agents, co-acting to form a vulcanizing agent, into and through the fabric.

In testimony whereof I have signed my name to the above specification.

DANIEL E. HENNESSY.